(12) United States Patent
Huijbers

(10) Patent No.: US 10,667,541 B2
(45) Date of Patent: Jun. 2, 2020

(54) PRESS FOR PROCESSING FAT CONTAINING MASS

(71) Applicant: Royal Duyvis Wiener B.V., Koog aan de Zaan (NL)

(72) Inventor: Hans Huijbers, Alkmaar (NL)

(73) Assignee: Royal Duyvis Wiener B.V. (NL)

( * ) Notice: Subject to any disclaimer, the term of this patent is extended or adjusted under 35 U.S.C. 154(b) by 296 days.

(21) Appl. No.: 15/308,904

(22) PCT Filed: May 8, 2015

(86) PCT No.: PCT/EP2015/060261
§ 371 (c)(1),
(2) Date: Nov. 4, 2016

(87) PCT Pub. No.: WO2015/169964
PCT Pub. Date: Nov. 12, 2015

(65) Prior Publication Data
US 2017/0071223 A1    Mar. 16, 2017

(30) Foreign Application Priority Data
May 8, 2014   (EP) ..................................... 14167595

(51) Int. Cl.
*A23G 1/08*     (2006.01)
*B30B 9/04*     (2006.01)
*B30B 9/06*     (2006.01)

(52) U.S. Cl.
CPC ............... *A23G 1/08* (2013.01); *B30B 9/045* (2013.01); *B30B 9/06* (2013.01)

(58) Field of Classification Search
CPC ........... B30B 9/26; B30B 9/262; B30B 9/045; B30B 9/06; B30B 13/00; B01D 33/29; C02F 11/122; A23G 1/08
See application file for complete search history.

(56) References Cited

U.S. PATENT DOCUMENTS 1,162,353 A    11/1915   Hanel
1,331,453 A *  2/1920   Bausman ................ B30B 9/045
                                              100/123
(Continued)

FOREIGN PATENT DOCUMENTS

CN    1424876 A    6/2003
CN    1200611 C    5/2005
(Continued)

OTHER PUBLICATIONS

English Translation of the First Chilean Office Action; dated Feb. 27, 2018 for CL Application No. 201602825.
(Continued)

*Primary Examiner* — Shelley M Self
*Assistant Examiner* — Jared O Brown
(74) *Attorney, Agent, or Firm* — Mendelsohn Dunleavy, P.C.

(57) ABSTRACT

The invention relates to a press (1) for separating fat containing mass, e.g. cocoa mass, into liquid fat and cake, comprising a frame (2), a plurality of pressing elements (6) disposed in the frame (2), and a hydraulic cylinder and plunger (3, 3A) for exerting pressure on the pressing elements (6), the pressing elements (6) comprising a pot (7) having a cavity (8) for receiving mass to be pressed, a squeezer (9) located at least partially in the cavity (8), and filters (11) disposed in front of the squeezer (9) and on the side of the cavity (8) opposite the squeezer (9), wherein, in the filling position of the press (1), the distance between the filters (11) is in a range from 10 to 90 mm. The ratio (Dc/Dp) of the diameter (Dc) of the hydraulic cylinder (3) and the diameter (Dp) of the cavities (8) is smaller than 1.15.

20 Claims, 2 Drawing Sheets

(56) References Cited

U.S. PATENT DOCUMENTS

| | | | |
|---|---|---|---|
| 1,755,353 A | | 11/1927 | Hubbert |
| 2,072,942 A | | 3/1937 | Carver |
| 2,715,965 A | * | 8/1955 | Carver ................ B30B 9/26 210/231 |
| 5,275,097 A | * | 1/1994 | Wettlaufer ........... B01D 25/12 100/113 |
| 2003/0161920 A1 | * | 8/2003 | Mantel ................ A23G 1/08 426/481 |
| 2017/0055543 A1 | | 3/2017 | Huijbers |

FOREIGN PATENT DOCUMENTS

| | | |
|---|---|---|
| DE | 14990 C | 1/1881 |
| DE | 1109501 B | 6/1961 |
| DE | 2557056 A1 | 6/1977 |
| EP | 0634268 A1 | 1/1995 |
| EP | 1042961 A2 | 10/2000 |
| GB | 512536 A | 9/1939 |
| WO | WO9212853 A1 | 8/1992 |
| WO | WO2015169377 A1 | 11/2015 |

OTHER PUBLICATIONS

Singapore Written Opinion; dated Sep. 13, 2017 for Singapore Application No. SG11201609309X.
International Preliminary Report on Patentability; dated Sep. 20, 2016 for PCT Application No. PCT/EP2015/060261.
English Translation of Japanese Office Action; dated Mar. 26, 2019 for JP Application No. 2016-566960.
"Notification of the First Office Action" for corresponding Chinese Application No. 201580030793.4; dated Sep. 4, 2019.
Decision of Rejection for corresponding Japanese application No. 2016-566960; dated Jan. 27, 2020 (7 pages).

* cited by examiner

PRESS FOR PROCESSING FAT CONTAINING MASS

The present invention relates to a press for separating fat containing mass, e.g. cocoa mass, into liquid fat, e.g. cocoa butter, and cake, comprising a frame, a plurality of pressing elements disposed in the frame, and a hydraulic cylinder and plunger for exerting pressure on the pressing elements, the pressing elements comprising a pot having a cavity for receiving cocoa mass to be pressed, a squeezer located at least partially in the cavity, and filters disposed in front of the squeezer and on the side of the cavity opposite the squeezer, wherein, in the filling position of the press, the distance between the filters is in a range from 10 to 90 mm. The invention further relates to a method of modifying a press.

A cocoa press generally comprises a hydraulic cylinder which is connected with a retainer by means of two separate tie rods. Present in the cylinder is a plunger and between said plunger and the retainer are disposed a plurality of pressing elements. Each of the pressing elements comprises a so-called pot, which defines a (usually cylindrical) cavity, and a squeezer, also known as counter pot or male pot, and typically two filters, one on each side (seen in axial direction) of the cavity.

During a cycle, the pressing elements are filled with cocoa mass via supply lines (inlets) and subsequently compressed. The cocoa butter is thereby pressed out through the filters and discharged. When a sufficient amount of butter has been pressed from the cocoa mass, the pressure is released and the press is returned to its starting position. At that position, the pots are pushed (or pulled) over the squeezers, and the cocoa cakes fall out. Finally, the pots are returned to the starting position and the cycle is complete.

Various cocoa presses have been made available by companies such as Duyvis, Nagema/Heidenau, Carle Montanari, and Bauermeister.

WO 92/12853 addresses the problem of increasing the productivity of a squeezer for squeezing oil-containing materials, particularly a mass of cocoa, without increasing the number or diameter of the squeezing chambers. To this end, the filtering elements placed on the chamber walls have a non-planar shape having an increased area, e.g. hemispherical, tapered or "serpentine".

EP 1 042 961 relates to a press for separating cocoa mass into cocoa cake and cocoa butter, comprising a frame, in which one or more pressure elements are disposed, and means for compressing the pressure elements, wherein the pressure elements each comprise a cavity for receiving cocoa mass to be pressed, in which cavity at least one filter and at least one squeezer are present. All points or nearly all points of the cavity are spaced from an imaginary plane through the filter or through one of the filters by a distance of less than 45 mm in the filling position of the squeezer. This makes it possible to increase the production capacity of the press.

It is an object of the present invention to further increase production capacity, i.e. the amount of mass processed per unit of time.

To this end, the method according to the invention is characterised in that the ratio (Dc/Dp) of the diameter (Dc) of the hydraulic cylinder and the diameter (Dp) of the cavities is smaller than 1.15. It is preferred that this ratio is smaller than 1.11, preferably smaller than 1.07, preferably smaller than 1.03, e.g. 1.00 and preferably larger than 0.8, preferably larger than 0.9.

A smaller ratio of the diameter of the hydraulic cylinder and the diameter of cavities results (caeteris paribus) in a lower specific pressure in the fat containing mass during pressing and thus in principle in a longer duration of cycles. Contrary to conventional perception, it was found that, in the claimed range, the relative increase in the volume of the cavities overcompensates the relative increase of the duration of the cycles, enabling a higher production capacity.

To further increase production capacity, in an embodiment, the distance between the filters is in a range from 20 to 80 mm, preferably in a range from 25 to 70 mm, preferably in a range from 30 to 60 mm, preferably larger than 30 and smaller than 60 mm. A decrease of the distance between the filters implies a smaller volume of the cavities, but also enables a decrease of the duration of the cycles, i.e. enables more cycles per unit of time. It was found that, in practice, the latter can overcompensate the former, yielding a higher production capacity.

In another embodiment, the diameter of the hydraulic cylinder is in excess of 500 mm, preferably in excess of 550 mm and/or the diameter (Dp) of cavities is in excess of 400 mm, preferably in excess of 450 mm, preferably in excess of 500 mm and/or the number of pressing elements (6) is in a range from 10 to 26, preferably in a range from 16 to 24.

Another embodiment comprises a controller 12 arranged to operate the hydraulic cylinder at pressures lower than 700 bar, preferably lower than 630 bar and preferably higher than 500 bar, combining higher production capacities and sufficient availability of hydraulic components.

In general, at least for industrial presses, it is preferred that the cavities are cylindrical, said filters are flat or substantially flat and/or wherein the side of the cavities opposite said squeezers are formed by the back of an adjoining squeezer.

The invention further relates to a method of modifying a press according to the preamble, which method is characterised by the step of increasing the diameter of the cavity or cavities, e.g. by machining the existing pots or by replacing the pressing elements, such that the ratio of the diameter of the hydraulic cylinder and the diameter of the cavities becomes smaller than 1.15. It is preferred that the diameter of the cavities is increased such that the ratio of the diameter of the cylinder and the diameter of the cavities becomes smaller than 1.11, preferably smaller than 1.07, preferably smaller than 1.03 and preferably larger than 0.8, preferably larger than 0.9.

To further increase production capacity, in an embodiment, the distance between the filters is reduced e.g. from 100 or 92 mm to a distance in a range from 20 to 80 mm, preferably in a range from 25 to 70 mm, preferably in a range from 30 to 60 mm, preferably larger than 30 and smaller than 60 mm.

It is preferred that at least some parts are maintained. In an embodiment, the inner diameter of the cylinder after modification is the same as the inner diameter of the cylinder before modification. In another embodiment, the frame comprises parallel tie rods and the pressing elements are slidably mounted on the tie rods and the distance between the tie rods after modification is the same as the distance between the tie rods before modification.

For the sake of completeness, attention in drawn to the following patent publcations.

GB 512 536 relates to a press for separating liquids from solids having a series of plunger-bearing plates mounted in column formation between a resistance head and a hydraulic ram, a series of rings being interposed one between each pair of plates, each ring slidably receiving the plunger of a bearing plate, hydraulic means operable independently of the ram are provided for forcing all the rings against the rear faces of the plates to seal the press chambers formed in the rings, during the filling of the chambers.

U.S. Pat. No. 2,072,942 relates to a an expressing press having a horizontally disposed series of co-axial press chambers, coaxial filter plates relatively movable axially forming the end walls of said chambers, a ring for each chamber forming the side walls thereof, each of said rings normally lapping over a filter plate on each end of its press chamber to enclose the press chambers, means for feeding material, which is to be pressed individually into the individual chambers while the filter plates are in expanded relation and the rings are in chamber-forming position, means for moving the filter plates axially toward each other under pressure, means for leading off expressed fluids, means for conjointly returning the filter plates to expanded relation with one set thereof remaining in unchanged relation to said rings and the second set thereof moved away from the first set within said rings, and means for sliding said rings relatively to the second set of filter plates to telescope thereover and cause the cakes in the chambers to be pushed out and dropped.

DE 1 109 501 discloses a cocoa press comprising an inlet (8) for cocoa mass and an outlet (11) for cocoa butter. The filling height of the pot (Preβtopf) is preferably about 20 mm and should not exceed 30 mm.

EP 0 634 268 is directed to a male pot for cacao and oil seed presses.

DE 14 990 concerns a cocoa press comprising a plurality of pressing elements (Kasten) each provided with a single filter means.

The invention will now be explained in more detail with reference to the drawings, which schematically show an example of a hydraulic cocoa press according to the invention.

Figure 1:
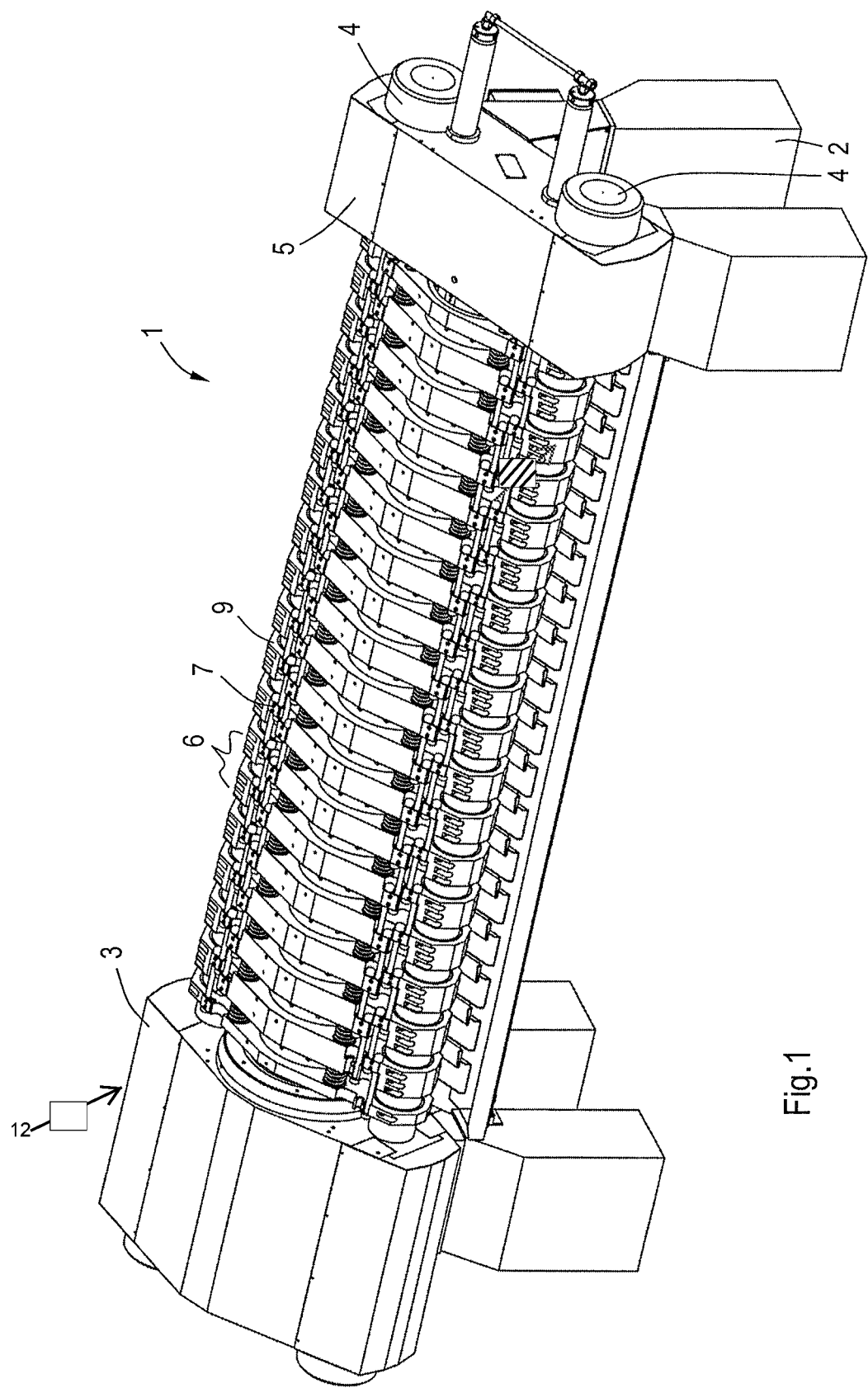
FIG. 1 is a perspective view of a hydraulic cocoa press according to the invention.

FIG. 1 shows a hydraulic cocoa press 1 comprising a frame 2 and a hydraulic cylinder 3 containing a plunger 3A, two parallel tie rods 4, and a retainer 5 mounted in the frame 2. A number of pressing elements 6, e.g. sixteen, eighteen or twenty, is located between the cylinder 3 and the retainer 5.

Figure 2:
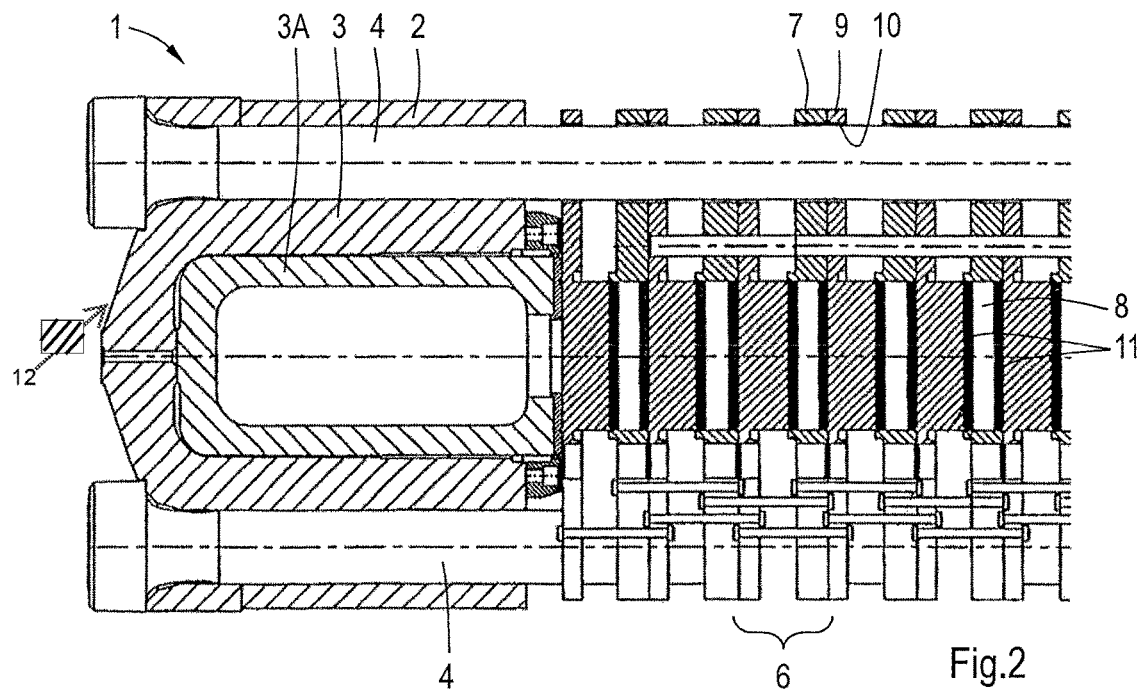
FIG. 2 is a cross-sectional view of the press of FIG. 1 in the filling position.
Figure 3:
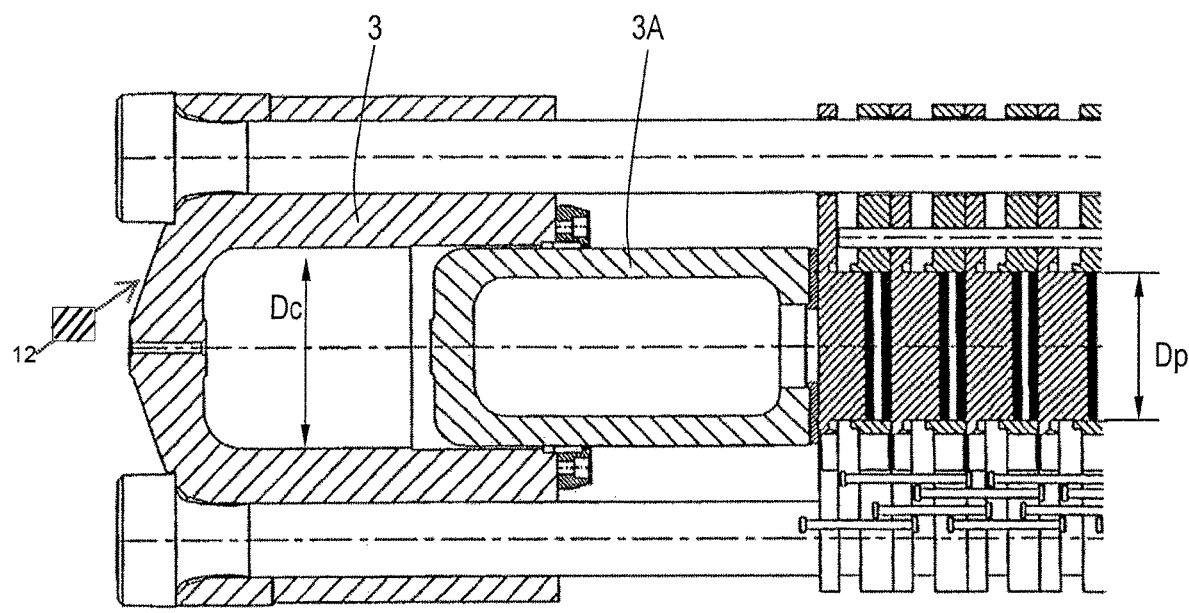
FIG. 3 is a sectional view corresponding to FIG. 2, showing the end of the pressure phase.

Each of the pressing elements 6, shown in cross-section in FIGS. 2 and 3, comprises a pot 7 having a cylindrical cavity 8 for receiving cocoa mass to be pressed, and a squeezer 9, also known as counter pot or male pot, sealingly positioned in the cavity 8. The pots 7 as well as the squeezers 9 are slidingly mounted round the tie rods 4 by means of circular openings 10, which are formed in the side portions of the pots 7 and the squeezers 9.

The cavity 8 is limited on both sides (in axial direction) by a disc-shaped filter 11, e.g. a filter cloth or metal mesh known in itself, mounted on a filter plate.

One filter plate is attached to the squeezer, whereas the other filter plate is attached to the back of a squeezer which forms part of an adjoining pressing element.

FIG. 2 shows the press 1 in the filling position. In this position, the plunger of the hydraulic cylinder 3 occupies (in FIG. 1) its extreme left-hand position, and the spacing between the disc-shaped filters 11, and thus the volume of cavity 8 in each of the pressing elements 6, is at its maximum. In this example, the spacing between the filters 11 that are present in each of the pressing elements 6 is 55 mm in the filling position.

Further, in this example, the inner diameter (Dc) of the hydraulic cylinder 3 is 600 mm and the diameter (Dp) of each of cavities 8 is 525 mm, providing a ratio (Dc/Dp) of 1.14.

During operation, the cavities of the cocoa press are filled with cocoa mass and, once filled, the pressing elements are compressed evenly by moving the plunger of the hydraulic cylinder towards the retainer until the pressure reaches a predetermined value, e.g. 535 bar. Then, the pressure is released and the press is returned to its starting position. At that position, the pots are pushed (or pulled) over the squeezers, and the cocoa cakes fall out. Finally, the pots are returned to the starting position and the cycle is complete.

The invention is not limited to the embodiment as described above, which can be varied in several ways within the scope of the claims, of course. Thus, the cocoa press described above can also be used for products of which the pressing and filtration behaviour is comparable to that of cocoa mass.

The invention claimed is:

1. A press for separating a fat containing mass into liquid fat and cake, said press comprising a frame, a plurality of pressing elements disposed in the frame, and a hydraulic cylinder and plunger for exerting pressure on the pressing elements, each of the pressing elements comprising a pot having a cavity for receiving mass to be pressed, a squeezer located at least partially in the cavity, and filters disposed in front of the squeezer and on a side of the cavity opposite the squeezer, wherein a ratio of a diameter of the hydraulic cylinder to a diameter of each said cavity is in a range from 0.9 to 1.15, and in a filling position of the press, a distance between the filters is in a range from 10 to 80 mm.

2. The press according to claim 1, wherein the ratio of the diameter of the cylinder to the diameter of each said cavity is smaller than 1.11.

3. The press according to claim 1, wherein in the filling position of the press the distance between the filters is in a range from 20 to 80 mm.

4. The press according to claim 1, wherein the diameter of the hydraulic cylinder is in excess of 500 mm.

5. The press according to claim 1, wherein the diameter of each said cavity is in excess of 400 mm.

6. The press according to claim 1, wherein a number of the pressing elements is in a range from 10 to 26.

7. The press according to claim 1, further comprising a controller configured to operate the hydraulic cylinder at pressures lower than 700 bar.

8. The press according to claim 7, wherein the controller is configured to operate the hydraulic cylinder at pressures higher than 500 bar.

9. The press according to claim 1, wherein the cavities are cylindrical, said filters are flat or substantially flat and/or the sides of the cavities opposite said squeezers are formed by backs of adjoining said squeezers.

10. The press according to claim 1, wherein the distance between the filters is in a range from larger than 30 mm to smaller than 60 mm.

11. The press according to claim 10, wherein the diameter of the hydraulic cylinder is in excess of 550 mm, the ratio of the diameter of the cylinder to the diameter of each said cavity is smaller than 1.03, the diameter of each said cavity is in excess of 500 mm, a number of the pressing elements is in a range from 16 to 24, said press further comprising a controller configured to operate the hydraulic cylinder at pressures higher than 500 bar and lower than 700 bar.

12. The press according to claim 1, wherein the ratio of the diameter of the cylinder to the diameter of each said cavity is smaller than 1.03.

13. A method of modifying a press for separating a fat containing mass into liquid fat and cake, said press comprising a plurality of pressing elements disposed in a frame and a hydraulic cylinder and plunger for exerting pressure on the pressing elements, each of the pressing elements comprising a pot having a cavity for receiving mass to be pressed, a squeezer located at least partially in the cavity, and filters disposed in front of the squeezer and on a side of the cavity opposite the squeezer, wherein, in a filling position of the press, a distance between the filters is in a range from 10 to 80 mm, said method comprising a step of increasing a diameter of the cavity or cavities such that a ratio of a diameter of the hydraulic cylinder to the diameter (Dp) of the cavity or cavities is in a range from 0.9 to 1.15.

14. The method according to claim 13, wherein the diameter of the cavity or cavities is increased such that the ratio of the diameter of the cylinder and the diameter of the cavity or cavities becomes smaller than 1.11.

15. The method according to claim 13, wherein the distance between the filters is in a range from 20 to 80 mm.

16. The method according to claim 13, wherein the diameter of the cylinder after modification of the press is the same as the diameter of the cylinder before modification of the press.

17. The method according to claim 13, wherein the frame comprises parallel tie rods and the pressing elements are slidably mounted on the tie rods and wherein a distance between the tie rods after modification is the same as a distance between the tie rods before modification.

18. Method according to claim 13, wherein the distance between the filters is in a range from larger than 30 mm to smaller than 60 mm.

19. The method according to claim 18, wherein the diameter of the cavity or cavities is increased such that the ratio of the diameter of the cylinder and the diameter of the cavity or cavities becomes smaller than 1.03.

20. The method according to claim 13, wherein the diameter of the cavity or cavities is increased such that the ratio of the diameter of the cylinder and the diameter of the cavity or cavities becomes smaller than 1.03.

* * * * *